US005873680A

United States Patent [19]

Huber et al.

[11] Patent Number: 5,873,680

[45] Date of Patent: Feb. 23, 1999

[54] METHOD AND INJECTOR ARRANGEMENT FOR CONVEYING PULVERULENT MATERIAL

[75] Inventors: Guido Huber, Schindellegi; Hans-Jörg Nussbaumer, Wagen, both of Switzerland

[73] Assignee: Elpatronic AG, Bergdietikon, Switzerland

[21] Appl. No.: 900,091

[22] Filed: Jul. 25, 1997

[30] Foreign Application Priority Data

Aug. 7, 1996 [CH] Switzerland .................. 1996 1936/96

[51] Int. Cl.[6] .................................................... B65G 53/14

[52] U.S. Cl. ............................................ 406/153; 406/141

[58] Field of Search .............................. 406/93, 151, 194, 406/153, 141, 142, 143

[56] References Cited

U.S. PATENT DOCUMENTS

| | | | |
|---|---|---|---|
| 954,944 | 4/1910 | Dunn | 406/153 X |
| 4,381,898 | 5/1983 | Rotolico et al. | 406/144 X |
| 5,429,156 | 7/1995 | Ueda et al. | 406/194 X |
| 5,615,980 | 4/1997 | Mauchle | 406/143 X |

FOREIGN PATENT DOCUMENTS

| | | | |
|---|---|---|---|
| 2747247 | 4/1978 | Germany | 406/93 |
| 56-155120 | 12/1981 | Japan | 406/151 |
| 1712278 | 2/1992 | U.S.S.R. | 406/144 |
| 1165225 | 9/1969 | United Kingdom | 406/144 |

*Primary Examiner*—Andrew C. Pike
*Assistant Examiner*—Joe Dillon, Jr.
*Attorney, Agent, or Firm*—McCormick, Paulding & Huber

[57] ABSTRACT

An injector arrangement for use where particulates are to be entrained in a gas transport medium. The apparatus has a nozzle discharging conveying gas and a secondary, dosing, gas flow provided from an annular passage. This secondary flow envelopes the conveying gas. Particulates are drawn into the combined gas streams by a venturi effect.

4 Claims, 2 Drawing Sheets

METHOD AND INJECTOR ARRANGEMENT FOR CONVEYING PULVERULENT MATERIAL

BACKGROUND OF INVENTION

The invention relates to a method and injector arrangement for conveying pulverulent material which is drawn in by a conveying gas flow to an intake zone and at least one adjustable second gas flow is introduced in addition to the conveying gas flow. The invention also relates to an application of the injector arrangement with a source of compressed air and an adjustable flow regulator.

It is known to convey pulverulent materials by means of an injector, or an injector arrangement comprising an injector and a compressed air source. In particular, for conveying of pulverulent coating powder, it is known to use an injector in which, after the introduction of the coating powder, dosing air is fed into the conveying air.

FIG. 1 shows such an injector 1 according to the state of the art. In this, air is blown through a nozzle 4 into the injector chamber 5, which has a powder intake 6 for introducing the powder into the conveying jet from a feed container which is not shown. The powder transported in the air jet passes into the chamber 10, where dosing air is fed to the powder stream via a connection 8 and a duct 9. The powder/air mixture is directed to the coating point through a hose connected to the hose connection 11, and conduits. The conveying air and dosing air, which are drawn from a conventional compressed air source, have hitherto been controlled either by separate control valves or by two valves mounted on a common shaft so that both valves could be adjusted by operating a single control knob.

Especially in applications where the powder/air mixture has to travel along a relatively long conduit to the coating point (eg. a distance of 1 meter or more) or where a highly homogeneous powder/air mixture is required, controlling the conveying air and dosing air has hitherto proved very difficult. Where material is carried over long distances and/or a high degree of homogeneity is required, the proportioning between conveying air (which determines the quantity of powder removed from the feed container) and dosing air (which affects the velocity of the powder/air mixture in the conduit and the homogeneity of the mixture) is very difficult to set correctly, and even using two coupled control valves it has been found that a satisfactory setting is possible only within a narrow operating range.

Conditions are particularly awkward in the known process for coating weld seams of can bodies at the end of a can body welding machine. For one thing, the supply of powder by means of the injector has to pass through an extended conduit, as the conduit has to be routed through the welding machine along the body forming and welding path. For another thing, in order to obtain a weld seam coating of good quality, the powder must be delivered onto the can body at a constant rate and with a uniform distribution as the body is conveyed past the coating nozzle. Can bodies are conveyed at a rate of eg. 18 cans per second (or, for a standard size can, at approximately 100 m/min), so that any fluctuation, even momentary, in the homogeneity of the powder/air mixture or in the absolute quantity of powder delivered may result in a large number of cans receiving an insufficient coating.

It has therefore already been proposed that the conveying air and dosing air should be drawn from a source with a constant conveying rate of flow. This solution, however, displays an unsatisfactory reaction if there is disturbance in the conduit. Pulsation may occur in the conduit and the resulting fluctuations may lead to accumulations of powder in the conduit.

Therefore the problem which lies at the basis of the invention is to provide a way of coating by means of an injector which avoids these drawbacks and in which, even under very difficult circumstances, and particularly in the coating of the weld seam of can bodies, excellent coating quality can be obtained.

SUMMARY OF THE INVENTION

In a method of the kind stated at the outset, this problem is solved by feeding the second gas flow into the powder intake zone. Feeding a gas flow into the powder intake zone changes the partial vacuum acting on the pulverulent material in the intake zone, so that the quantity of powder drawn in can be determined by the gas flow. The conveying gas flow can remain unchanged. It has been found that this allows a uniform and stable transfer of powder to be obtained, even through lengthy conduits.

The second gas flow is preferably introduced into the powder intake chamber in the same direction as the conveying gas flow and also preferably through an annular gap around the nozzle of the conveying gas flow, so that the latter is surrounded by the second gas flow. Alternatively, the second gas flow may be introduced transversely with respect to the conveying gas flow, whether at an oblique angle or at an angle of 90°.

In an injector arrangement of the kind stated at the outset, the problem is solved by providing an intake chamber connected with a powder feed connection and a conveying gas nozzle discharging into the chamber and a connection for at least one further gas flow through a duct opening into the chamber. Preferably the method and/or arrangement will be used for the coating of can bodies, but they may also be used for other purposes and for other materials to be conveyed.

BRIEF DESCRIPTION OF THE DRAWINGS

Embodiments of the invention will now be described in detail by way of example, with reference to the drawings, in which.

DESCRIPTION OF THE PREFERRED EMBODIMENTS

Figure 1:
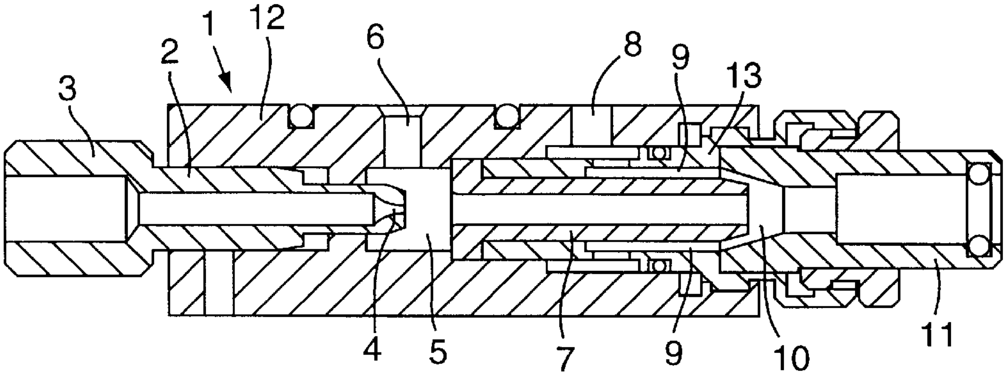
FIG. 1 PRIOR ART
FIG. 1 shows an injector, in section according to the state of the art.

The injector 1 in FIG. 1, shown as an example of a known injector according to the state of the art, has a casing 12. Formed inside the casing is the injector chamber 5 into which the nozzle 4 of the injector protrudes. The nozzle 4 is supplied with gas, usually compressed air, via the connection 3 and connection 2, and this flow of compressed air forms the conveying air flow. A connection 6 communicates with the injector chamber 5; through this connection, the material to be conveyed is fed from a feed container (not shown) into the injector chamber, in which the jet of conveying air produces a partial vacuum. The material to be conveyed is entrained by the conveying air flow. The conveying air flow passes through a sleeve 7. On the outside of the sleeve, the casing 12 is provided with a connection 8 for the dosing gas, which is likewise usually compressed air. The dosing air is conveyed to the chamber 10—into which the conveyed air flow also passes—through the duct 9 formed between the sleeve 7 and a guide sleeve 13 which surrounds, with clearance, part of the sleeve 7. The two air flows combine and leave the injector 1 through the coupling 11 to which a conduit is connected to convey the powder/air mixture to the point of use.

In the preferred application, ie. the conveying of coating powder for coating the weld seams of can bodies, coating powder from a feed container with a capacity of eg. 3–4 kg of powder is conveyed with compressed air (eg. in the range of 6 to 10 bar) through the injector and into a conduit which, in a known manner, enters the can welding machine at the rounding unit, passes through the welding zone, and then discharges through a nozzle which sprays the powder/air mixture onto the weld seam on the inside of the can, in order to coat the seam. The spraying process is usually assisted by giving the coating powder an electrostatic charge. The powder deposited on the weld seam is heated, and yields a coherent seam coating which hardens upon cooling. Suitable coating powders are known and are commercially available, and the coating process, as such, is known. As already stated, it is very tricky to adjust the conveying air and dosing air to ensure that sufficient powder, homogeneously distributed, is conveyed to the nozzle with sufficient velocity (approximately 12 m/sec) to provide a uniform coating.

Figure 2:
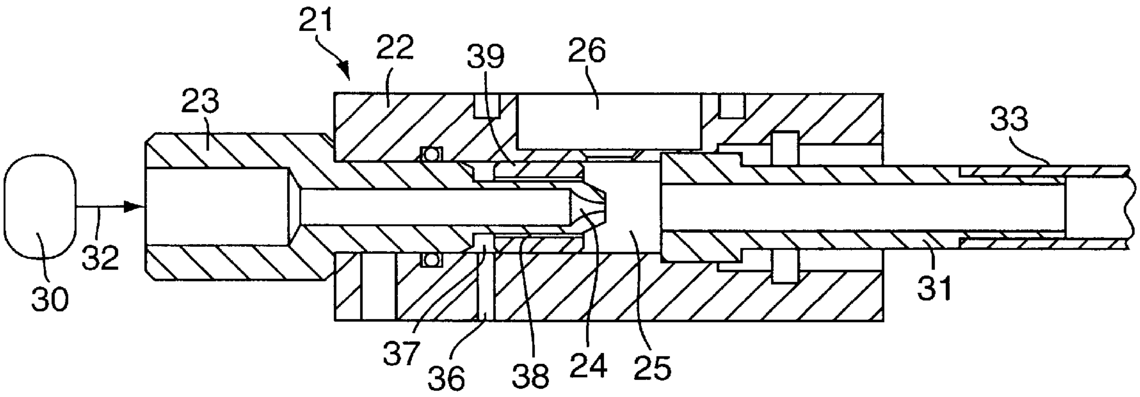
FIG. 2 shows an arrangement with an injector, in section according to the invention and a compressed air source.

FIG. 2 shows an injector arrangement as an embodiment of the invention and to illustrate the method according to the invention. In this embodiment an injector 21 is provided with a casing 22. Formed inside the casing is an injector or powder intake chamber 25 into which nozzle 24 of the injector protrudes. The nozzle 24 is supplied with a conveying gas flow via the connection 23, usually from a compressed air source 30 through a conduit 32, which in FIG. 2 is only indicated schematically. Communicating with the injector chamber is a connection 26, through which the powder to be conveyed is fed from a feed container (not shown) into the chamber 25. Within the injector chamber 25 a partial vacuum is created by the conveying gas flow. The partial vacuum draws in the powder to be conveyed, which is entrained by the conveying gas flow. The conveying gas flow together with the powder exits through a coupling 31 to which a conduit 33 is connected to convey the powder/air mixture to the point of use, preferably —as previously described—to the seam zone of welded can bodies.

In accordance with the invention, a second gas flow is introduced into the powder intake zone of the injector. In the embodiment shown in FIG. 2, the injector casing 22 is provided with a connection 36 to which a gas conduit or compressed air conduit (not shown) is connected. This conduit may be supplied from the same source 30. In the example shown, the connection 36 leads to an annular chamber 37 surrounding the part of the connection 23 which extends within the casing 22, and whence an annular gap 38 leads into the chamber 25. In the example shown, this gap is formed by a sleeve 39 which surrounds, with a predetermined clearance, the forward, nozzle-containing part of the connection 23.

Figure 3:
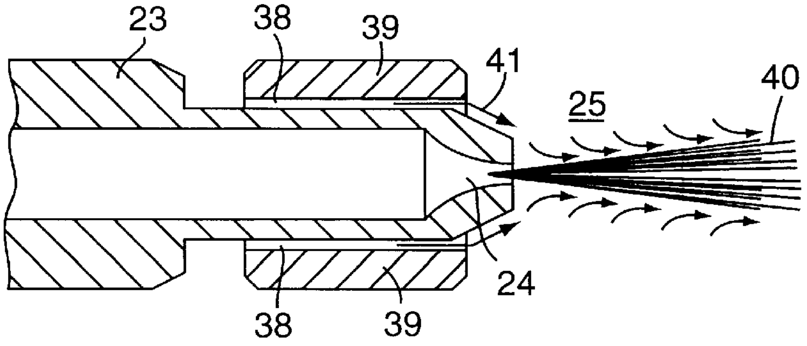
FIG. 3 is a detail view of the inlet for the gas flow entering the injector chamber.

The gas flow 41 (FIG. 3), which in this example enters the injector chamber through the gap 38, surrounds the conveying gas jet 40. The quantity of powder sucked into the injector chamber 25 is affected by the gas flows. Thus, as the amount of air admitted in the gas flow 41 increases, the quantity of powder sucked in, and conveyed by the injector, is reduced; and as the amount of air admitted in the flow 41 decreases, the quantity of powder conveyed is increased. By adjusting the supply of air at the connection 36, and hence the supply of air to the chamber 25, it is therefore possible to adjust the quantity of powder conveyed while the conveying gas flow remains unchanged.

With the arrangement shown as an example, sufficient variation in the quantity of powder conveyed can be obtained by admitting as the gas flow 41 a flow of air corresponding to 0% to 15% of the conveying gas flow 40, taking the latter to be equal to 100%. Taking the quantity of powder conveyed as 100% for a 0% gas flow 41, then approximately 30% powder is conveyed with a 15% gas flow 41. The values may, of course, vary according to the design of the injector, but it has been found that by means of the second gas flow 41 it is possible to obtain a precise dosing of the powder flow and very good conveying characteristics in the conveyor path downstream of the injector. The proportion of the gas flow 41 admixed with the conveying gas flow 40 may fall within other ranges than the 0–15% which has been indicated; eg. it may lie in the range of 3–10%, or 4–11%; and it may exceed 15%.

Figure 4:
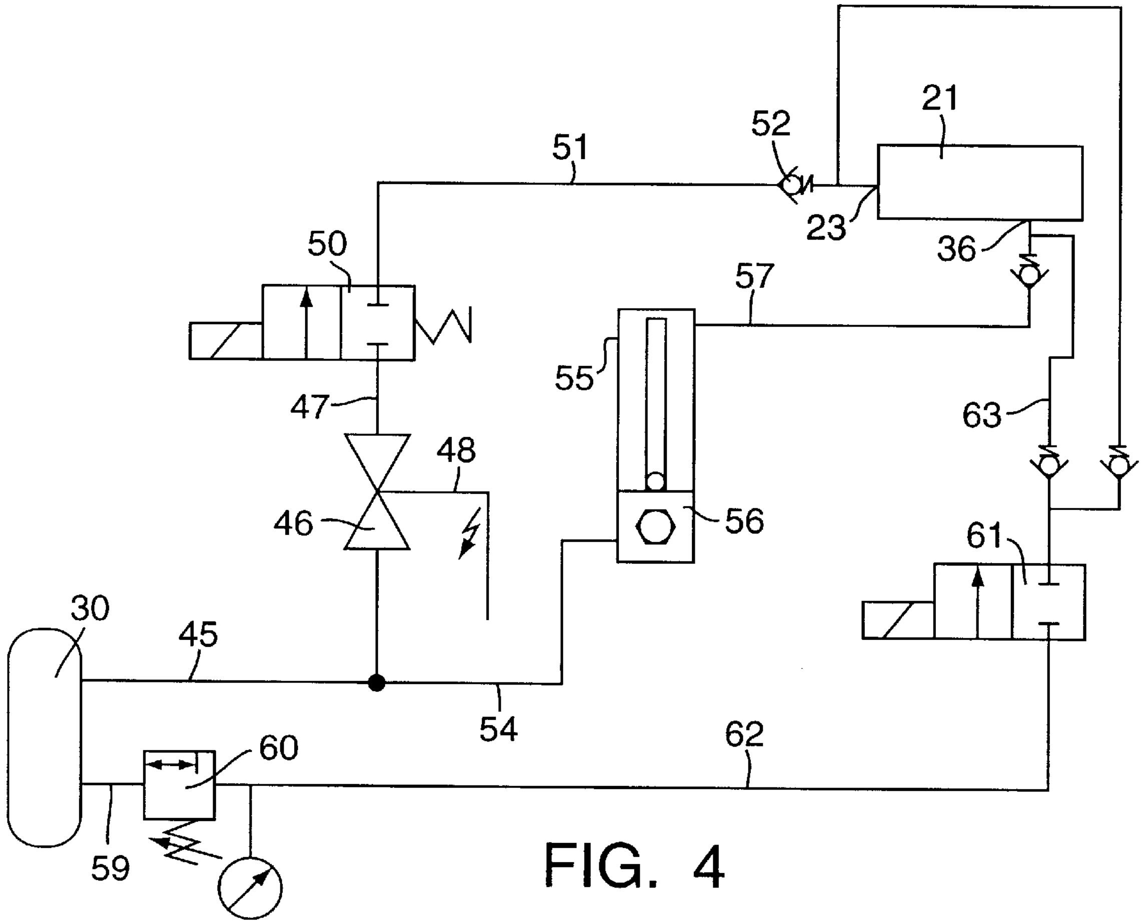
FIG. 4 is a pneumatic diagram to explain the method and the arrangement.

FIG. 4 is a schematic pneumatic diagram with the injector 21 illustrated as a block, and showing the conveying air connection 23 and gas flow connection 36. The conveying air and the second gas flow air are supplied from a compressed air source 30 which is only schematically illustrated and which is connected by a conduit 45 to a regulating valve 46 which supplies a constant rate of airflow at its outlet conduit 47. The airflow can be set by an electrical control signal through control line 48 from a control unit (not shown). The flow of air discharged by the valve 46 is automatically kept constant by the valve itself. Such a valve, also known as a mass flow regulator, may for example be a Type F201C mass flow regulator made by Bronkhorst of the Netherlands.

A switchable valve 50 may be arranged downstream of the regulator 46 as main valve, for switching on and off the air supply to the conveying air connection 23 of the injector. The airflow discharged by the regulator 46 then passes via the conduit 51 and non-return valve 52 to the conveying air connection 23 of the injector 21. Upstream of the regulating valve 46 for the conveying air, a conduit 54 branches off to a flowmeter 55 which has a setting device 56 for adjusting the flow of the compressed air passing through. As the regulator 55, a standard commercial flowmeter made by V ögtlin AG, Switzerland, may be used. The setting device 56 is used to set the rate of flow of air, which then passes through the conduit 57 to the connection 36 of the injector 21 where, as the second gas flow 41, it determines the quantity of powder which is entrained. Modifications can, of course, be made to this pneumatic arrangement, which is merely given as an example. For instance, the regulating valve 46 can be omitted if the flow of conveying air from the source 30 is constant enough.

To clean the injector 21 when it is not in operation, a flushing air conduit 59 can be provided, through which flushing air can be fed into the injector through a pressure regulator 60, conduit 62, main valve 61 and conduit 63.

The gas flow 41 may also be introduced into the injector chamber 25 transversely with respect to the conveying air flow, that is to say, at an oblique angle or at an angle of 90°. In this case, suitable discharge openings for the gas flow should be provided in the injector chamber 25, through which the gas flow enters the chamber. These openings should be connected to the connection 36 by suitable passageways in the casing 22.

We claim:

1. An injector arrangement comprising:

an injector casing; and a conveying gas nozzle communicating with a powder intake connection and a powder intake chamber defined by the injector casing for drawing pulverulent material through the powder intake connection and into the powder intake chamber by discharging a conveying gas flow through the nozzle, the injector casing defining an annular gap extending generally in a direction of the conveying gas flow and located generally upstream of the powder intake chamber relative to the gas flow, the annular gap opening into the powder intake chamber for introducing a dosing gas flow into the powder intake chamber generally coaxially with and in the direction of the conveying gas flow to surround the conveying gas flow, and the injector casing further defining a conduit located downstream of the powder intake chamber relative to gas flow for feeding a pulverulent material borne by the conveying and dosing gas flows to a remote location.

2. Injector arrangement according to claim 1, further including an adjustable flowmeter disposed between a source of gas flow and a gas flow connection to the injector casing.

3. Injector arrangement according to claim 1, further including an adjustable flow regulator disposed between a source of gas flow and the conveying gas nozzle.

4. Injector arrangement according to claim 1, wherein the annular gap extends about at least a part of the conveying gas nozzle.

* * * * *